A. E. RHOADES.
PULLEY BEARING.
APPLICATION FILED JULY 24, 1912.
1,089,381.
Patented Mar. 3, 1914.
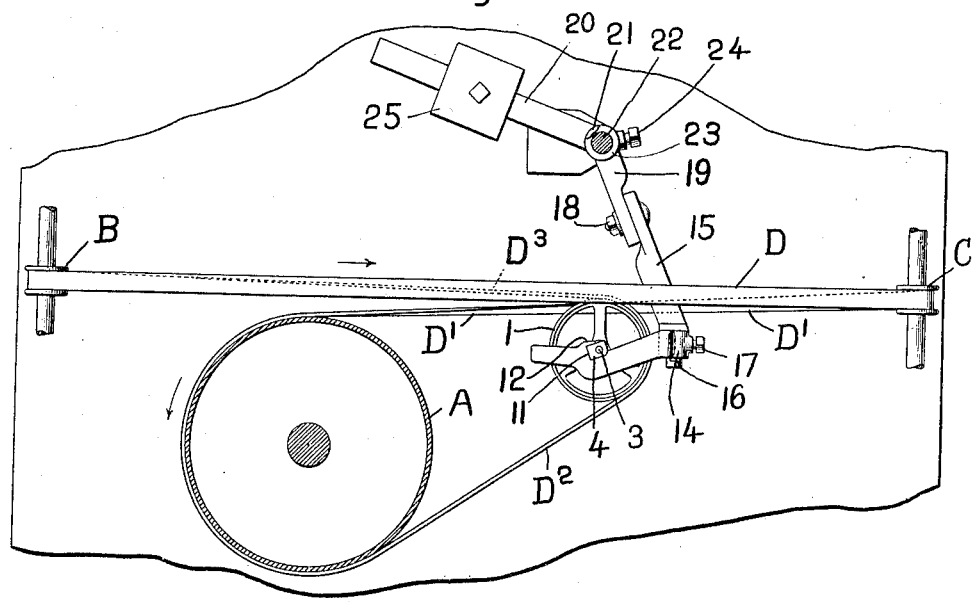
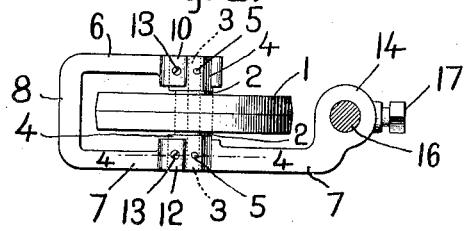
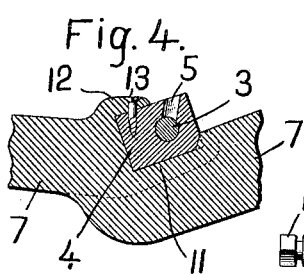
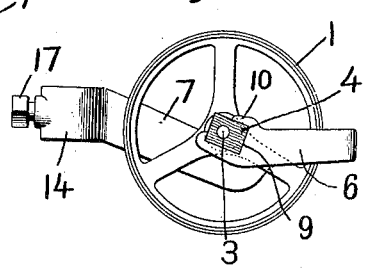
Witnesses.
Thomas J. Drummond
Warren O'Neil
Inventor.
Alonzo E. Rhoades,
by Edwards Heard & Smith
Atty's.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

PULLEY-BEARING.

1,089,381.  Specification of Letters Patent.  Patented Mar. 3, 1914.

Application filed July 24, 1912. Serial No. 711,204.

*To all whom it may concern:*

Be it known that I, ALONZO E. RHOADES, a citizen of the United States, and resident of Hopedale, county of Worcester, State of Massachusetts, have invented an Improvement in Pulley-Bearings, of which the following description, in connection with the accompanying drawing, is a specification, like characters on the drawing representing like parts.

This invention has for its object the production of a simple, effective and durable tension or take-up device for driving belts or bands, whereby the belt or band is maintained at the desired tension, the device being so constructed that it can be brought readily and quickly into coöperative relation with the belt or band.

The invention particularly resides in the construction and arrangement of the bearing of the take up pulley whereby the pulley may readily be assembled in the bearing and proper lubrication secured.

The novel features of my invention will be fully described in the subjoined specification and particularly pointed out in the following claims.

Figure 1 is a side elevation and part sectional view showing a driving belt or band and a tension or take-up device embodying my invention coöperating therewith; Fig. 2 is an enlarged top plan view of the take-up pulley or sheave and the open yoke-like holder therefor, showing more clearly the structural details; Fig. 3 is a side view of the holder, viewed from the open side thereof; Fig. 4 is a greatly enlarged sectional detail, on the line 4—4, Fig. 2, showing one of the journal bearings, and its seat in the holder.

The use of a tension or take-up device in connection with a driving belt or band is for the purpose of maintaining the latter at all times under proper tension by taking up any stretch or slackness which may develop.

In Fig. 1 I have shown, for illustrative purposes only, one arrangement of a driving belt, in order that my present invention may be more clearly understood, and in said Fig. 1 a driving pulley or drum is indicated at A, and at opposite sides thereof are two smaller pulleys B, C, rotating on vertical axes. The endless flat driving belt or band is shown at D as passing from pulley B to pulley C above the driving member A and then back at D' to said member and around it and thence at $D^2$ to the sheave or pulley of the tension or take-up device, to be referred to. From such sheave or pulley the belt is reversed in direction and leads over the driving member A, as at $D^3$, but without touching it, to the pulley B, completing the circuit. By this arrangement of the belt the parts $D^2$, $D^3$ thereof form a bight in which the tension sheave is inserted, and by applying the take-up device to the bight the requisite tension for the entire belt is maintained, and by locating said device between the runs D and D' of the belt ample room is provided therefor. This particular arrangement of the belting is not necessary, however, to the use of the take-up device, but it shows very clearly one mode of using the latter.

The sheave or pulley 1 of the take-up device, shown as having a slightly crowned face, has its hub 2 fixedly attached to a metal shaft the opposite ends of which project beyond the hub and form journals 3, and said journals are mounted rotatably in opposite bearings 4.

The bearings are made of fibrous material, and preferably of some tough wood thoroughly impregnated with a lubricant, and bored longitudinally to receive the journal 3, an oil-hole 5 being bored in the bearing from its uppermost face to the journal hole or bore. Herein the bearing is shown as a polygonal or rectangular block of wood, with the grain running lengthwise thereof, or in the direction of the strain to which the pulley 1 is subjected when in use, in order that the greatest resistance to wear may be utilized; that is, the wear due to rotation of a journal 3 in one of the bearings is taken by the ends of the fibers of which the bearing is composed. The two bearings are held firmly and securely in opposite, open seats in a holder or yoke, and referring to Fig. 2 it will be seen that the ends of the pulley hub 2 rotate between and in close proximity to the inner ends of the bearings 4, said ends extending beyond the adjacent ends of the seats, so that no part of the pulley contacts with or moves over any part of the yoke or holder. In other words, the relatively moving and contacting parts of the pulley and its yoke holder are composed of metal and wood, thereby reducing friction to a minimum and making the wear so slight as to be practically negligible.

The yoke or holder is substantially U-shaped, and comprises a shorter leg 6 and an opposite longer leg 7, said legs being connected at their outer ends by a cross bar 8, and in the opposite end of the leg 6 is formed an open-ended seat 9, shown as rectangular in shape, the upper part of the seat being partly overhung by a flat-faced lip 10, Fig. 3. A similar, oppositely located and open-ended seat 11 is formed in the longer leg 7, and this seat has a correspondingly flat and overhanging lip 12. The lips project over and contact with flat faces of the bearings 4, as clearly shown, and in conjunction with the general shape of the seats serve to retain the bearings therein, and prevent any tendency of the bearings to turn in the seats.

Endwise movement of a bearing in its seat is prevented by a screw 13 which is passed through a hole in the overhanging lip and screwed into the bearing, as best shown in Fig. 4.

To assemble the pulley and yoke the former is placed between the legs of the latter with the journals 3 extending into the empty seats, into which they are passed through the open tops of the seats. The bearings 4 are now pushed endwise into the seats from their outer ends, the journals entering the bored holes provided therefor, and when the bearings are properly positioned with their inner ends extended beyond the adjacent ends of the seats the retaining members 13 are applied, and the bearings are fixed securely in place.

The bearings fit snugly in the seats, to prevent any chatter or non-alinement of parts, and as the strain due to the pull of the belt or band on the pulley 1 is toward the closed end of the yoke the grain of the wood is located in that general direction, for offering the greatest resistance to the wear of the metallic journals 3 on the oil-impregnated wood 4.

As shown in the drawing the free end of the longer arm 7 of the yoke has formed upon it a hub 14 having its axis in a plane at right angles to the axis of the pulley 1 and midway between the legs of the yoke. The open space or clearance between said hub 14 and the bearing carrying end of the yoke leg 6 provides a side entrance by means of which the belt or band can be applied to or removed from the pulley quickly and easily, without any separation of the parts of the pulley and its yoke, as will be apparent, this side entrance being particularly desirable when the tension or take-up pulley is inserted in a bight of the belt, as in Fig. 1.

Should the belt break all that is necessary after it has been repaired is to slip the bight of the belt onto the exposed portion of the pulley 1 at the open side or entrance of the yoke.

The pulley and yoke having been once assembled, as before described, there is no occasion to separate them, and they remain assembled until it is necessary, after a long time, to replace the bearings.

As will be apparent from Fig. 2 the pull of the take-up device upon the bight of the band is in a direction along the longitudinal center or axis of the yoke, so that the strain is distributed uniformly and equally upon both journals 3 and their bearings.

If the bearings are in the first instance thoroughly impregnated with a suitable lubricant a very little additional lubricant from time to time is all that is required, applied by means of the ducts 5.

Referring to Fig. 1 the yoke is supported by a hanger 15, having a rounded shank 16 which enters the hub 14, and by means of a set screw 17 the yoke can be set and held in any desired lateral position about the shank as a center. Said hanger is connected at its upper end, by a clamp swivel 18, with the depending arm 19 of a carrier 19, 20 having a hub 21 to rock on a fixed fulcrum support or shaft 22. In practice a collar, as 23, can be set on the latter at each side of the hub 21, by a set-screw 24, to prevent lateral movement of the carrier on the support 22. A weight 25 is adjustable on the carrier arm 20, and heavy enough to counterbalance the weight of the take-up device, and to exert upon the yoke and its pulley a continuous and uniform pull on the belt or band sufficient to subject the same to the desired tension. Adjustment of the weight inward or outward along the carrier arm 20 will decrease or increase, respectively, the tension to which the driving belt or band will be subjected.

By means of the clamp-swivel 18 the hanger 15 can be adjusted into the angular position best adapted for positioning properly the pulley of the take-up device, and this adjustment, together with the lateral adjustment of the yoke about the shank 16 will provide for all arrangements of belting and for the proper coöperation of the take-up device therewith.

Having fully described my invention, what I claim as new and desire to secure by Letters Patent is:

1. In a device of the character described, a yoke provided with alined open-ended and polygonal seats partially open at their tops, a non-metallic bearing fitting and insertible endwise into each seat and extended beyond the inner end thereof, means for holding each bearing fixedly in its seat, and a pulley having a metal hub and rigidly attached metallic journals extended beyond the hub ends and rotatably mounted in the bearings, the ends of the hub rotating between and in close proximity to the projecting inner ends of the bearings, whereby the parts may be assembled by inserting the pulley in the yoke and the journals through the tops of the empty seats and then inserting the bearings endwise into the seats over the journals and whereby thus contact of metal upon metal is wholly obviated.

2. In a take-up device for driving belts, a metallic yoke having two alined polygonal and open-ended seats each provided with an overhanging lip thus to present partially open tops, a non-metallic bearing insertible endwise and fitted in each seat and extending at its inner end beyond the adjacent end of the seat, a retaining member extended removably through each lip and into the bearing to prevent endwise movement thereof in the seat, and a metal pulley having oppositely extended journals mounted rotatably in the bearings, whereby the parts may be assembled by inserting the pulley in the yoke and the journals through the tops of the empty seats and then inserting the bearings endwise into the seats over the journals and whereby thus contact of metal upon metal is wholly obviated.

In testimony whereof, I have signed my name to this specification, in the presence of two subscribing witnesses.

ALONZO E. RHOADES.

Witnesses:
FRANK H. FRENCH,
E. D. OSGOOD.

---

Copies of this patent may be obtained for five cents each, by addressing the "Commissioner of Patents, Washington, D. C."